No. 642,744. Patented Feb. 6, 1900.
G. A. GRIFFIN.
EYEGLASSES.
(Application filed July 27, 1899.)

(No Model.)

WITNESSES:
M. R. Hartley
F. P. Sargent

INVENTOR
Geo. A. Griffin
BY H. Albertus West
ATTORNEYS

UNITED STATES PATENT OFFICE.

GEORGE A. GRIFFIN, OF NEW YORK, N. Y., ASSIGNOR TO THE JULIUS KING OPTICAL COMPANY, OF SAME PLACE.

EYEGLASSES.

SPECIFICATION forming part of Letters Patent No. 642,744, dated February 6, 1900.

Application filed July 27, 1899. Serial No. 725,222. (No model.)

*To all whom it may concern:*

Be it known that I, GEORGE A. GRIFFIN, a citizen of the United States, and a resident of New York, borough of Brooklyn, in the county of Kings and State of New York, have invented certain new and useful Improvements in Eyeglasses, of which the following is a specification.

This invention relates to the construction of bow-springs for eyeglasses.

Figure 1:
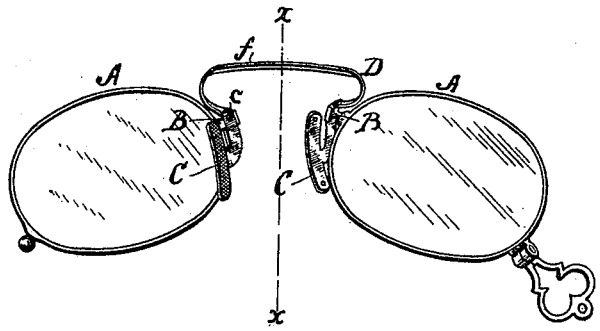
Figure 2:
Figure 3:
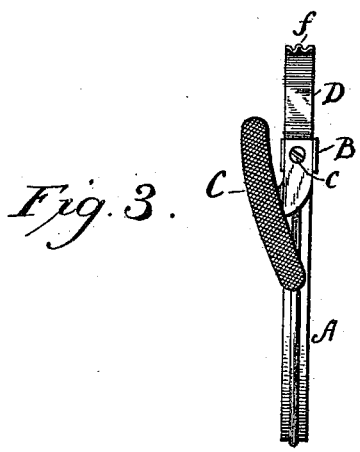

In the accompanying drawings, to which reference is made and which form a part of this specification, Figure 1 is a front view of a pair of eyeglasses made in accordance with my invention. Fig. 2 is a plan view of the same, and Fig. 3 is a sectional elevation on line X X of Fig. 1.

A A represent the lenses, provided with studs B B, of the usual or of any approved construction, adapted to receive the stud-screws c c for holding the eyeglass-guards C C and the ends of the bow-springs D. The guards C C may be of any approved form, but as here shown are of the offset type.

The bow-spring D is formed with one or more ribs or corrugations f along the center thereof, preferably two, parallel with the edges of the spring. This construction modifies the action of the spring and causes the ends of the spring to exert direct pressure on the nose-guards, as distinguished from curvilinear action, and thus counteracts the tendency of the glasses to slide upward on or outward off from the nose, due to muscular movement at the points of contact of the nose-guards with the nose, and the extent of modification of the spring may be regulated by the length of the ribs either at the time the spring is made or by the optician by flattening the ribs at the ends with pincers or otherwise— that is to say, while the corrugation stiffens the spring, which stiffening may be shortened in extent by the optician, the stiffening at the same time prevents downward bowing of the spring at the center when the glasses are placed upon the nose. This localizes the spring action and transfers it to the ends or downwardly-projecting arms at each side of the corrugations.

Having thus described my invention, what I claim as new, and desire to secure by Letters Patent, is—

As an improved article of manufacture, a bow-spring of uniform thickness for eyeglasses, having one or more ribs or corrugations along the center thereof, substantially as described.

GEORGE A. GRIFFIN.

Witnesses:
LEO WORMSER,
WALTER G. KING.